United States Patent [19]

Gardner et al.

[11] Patent Number: 5,087,674
[45] Date of Patent: Feb. 11, 1992

[54] ACID SCAVENGED POLYMER HALOGENATION

[75] Inventors: Irwin J. Gardner, Scotch Plains; James V. Fusco, Red Bank; Neil F. Newman, Edison; Ronald C. Kowalski, New Providence; William M. Davis, Edison, all of N.J.

[73] Assignee: Exxon Research & Engineering, Florham Park, N.J.

[21] Appl. No.: 595,915

[22] Filed: Oct. 11, 1990

Related U.S. Application Data

[63] Continuation of Ser. No. 404,995, Sep. 8, 1989, which is a continuation of Ser. No. 154,928, Feb. 11, 1988, abandoned, which is a continuation of Ser. No. 656,435, Oct. 1, 1984, abandoned.

[51] Int. Cl.$^5$ ............................................. C08F 8/22
[52] U.S. Cl. ................................... 525/356; 525/333.7; 525/334.1; 525/357
[58] Field of Search ................................ 525/356, 357

[56] References Cited

U.S. PATENT DOCUMENTS

| | | | |
|---|---|---|---|
| 2,470,952 | 5/1949 | Remy | 260/85.1 |
| 2,637,753 | 5/1953 | Been et al. | 260/772 |
| 3,099,644 | 7/1963 | Parker et al. | 260/85.3 |
| 3,180,856 | 4/1965 | Szalla et al. | 260/79.3 |
| 3,192,188 | 6/1965 | Orthner et al. | 260/88.2 |
| 3,397,174 | 8/1968 | Parker et al. | 525/332.1 |
| 3,454,544 | 7/1969 | Young et al. | 260/88.2 |
| 3,956,247 | 5/1976 | Landi et al. | 525/332.1 |
| 4,051,083 | 9/1977 | Newman | 525/216 |
| 4,200,703 | 4/1980 | Diebel et al. | 525/357 |

Primary Examiner—Bernard Lipman
Attorney, Agent, or Firm—H. L. Cohen

[57] ABSTRACT

A process for halogenating polymers by contacting a polymer either in solution or in bulk with a halogenating agent in the presence of an acid scavenger. Halogenated polymer, e.g., butyl rubber, with a particular structure is obtained and the product suffers less molecular weight loss. Combinations of acid scavengers can also be used and the scavenger can be dispersed in the polymer prior to halogenation and/or added to the reaction zone during halogenation.

18 Claims, No Drawings

ACID SCAVENGED POLYMER HALOGENATION

This is a continuation, of application Ser. No. 404,995, filed Sept. 8, 1989 which is a R.60 continuation of U.S. Ser. No. 154,928 filed 02/11/88 (now abandoned) which is a R.60 continuation of U.S. Ser. No. 656,435 filed 10/01/84 (now abandoned).

BACKGROUND OF THE INVENTION

This invention relates to a method of modifying polymers with a halogen or halogens; specifically to a process for the production of halogenated polymers. More specifically, it is directed to a continuous process for the manufacture of halogenated polymers such as butyl (a copolymer of a major proportion of an isoolefin and a minor proportion of a multi-olefin) EPM (a copolymer of ethylene and propylene), EPDM (a terpolymer of ethylene, propylene and a nonconjugated diene), SBR (styrenebutadiene rubber), BR (polybutadiene rubber), polyisoprene rubber, various types of polyethylene, including linear low density polyethylene, ethylene vinyl acetate copolymer, etc.; in particular halogenation wherein a substitution reaction results in the generation of hydrogen halide as a by-product or where hydrogen halide may be formed.

Numerous references teach methods for halogenating various polymers, for example the halogenation of butyl rubber. An early reference, U.S. Pat. No. 2,944,578, teaches that chlorinated butyl rubber can be produced in a batch process by dissolving butyl rubber in a suitable, nonreactive solvent, e.g., hexane, and introducing chlorine or a chlorinating agent. By suitable control of the temperature, concentrations of chlorinating agent and rubber, and reaction time, chlorinated rubber containing the desired level of chlorine is produced.

An improved, continuous solution process for chlorination or bromination of butyl rubber was subsequently disclosed in U.S. Pat. No. 3,099,644. The halogenation of ethylene-propylene nonconjugated diene elastomers (EPDM) has also been disclosed; such processes are analogous to those for halogenating butyl rubber. For example, U.S. Pat. No. 4,051,083 describes the solution bromination and chlorination of EPDM using N-halosuccinimide; additionally, the "neat" halogenation of EPDM is also described. In the latter disclosure the halogenating agent is dispersed in the EPDM by blending on a cool rubber mill and halogenation is effected by heating the mixture in a hydraulic press.

Halogenation of EPDM in an aqueous batch process is disclosed in U.S. Pat. No. 3,896,095. The process employs the addition of an excess of $Cl_2$ or $Br_2$ to a polymer slurry to effect halogenation and avoid the expense of solvent recovery systems previously disclosed for solution halogenation processes.

Chlorobromination of polymers such as polybutadiene, butadiene-isoprene copolymers and natural or synthetic polyisoprene is disclosed in British 1,483,063 and 1,483,064. The reaction is described as taking place at a low temperature of 0°-15° C., preferably in an inert solvent, and the halogenation products are described as containing high levels, e.g., at least 55% by weight of halogen.

The possibility of producing a halogenated rubber such as halogenated butyl rubber continuously in an extruder-reactor has been recognized, see, e.g., U.S. Pat. No. 4,185,057. However, the generalized disclosure of that reference does no more than acknowledge the desirability of such a process, but does not teach one how to accomplish such a process. The reference suggests that only enough chlorine be introduced into the extruder to react with the butyl rubber so that no chlorine remains after reaction. It then goes on to suggest that another gas, e.g., nitrogen, be introduced to effect the production of gas filled pores in the finished rubber, which is the primary object of the invention. No examples are disclosed in the patent and no conditions disclosed which would enable one to actually conduct such a butyl halogenation process.

Chlorination of butyl rubber using dichloramine-T and a calender has been reported by Bulgarian workers (Kh. Tenchev. et al, Chem Abstracts 50756u). The disclosed process was not intended to produce neat chlorinated butyl since calendering is carried out on a mixture of butyl rubber, accelerators, prevulcanization inhibitors as well as variable amounts of carbon black and dichloramine-T.

The halogenation, in a kneader or extruder, of polymers containing carboxylic acid groups using reagents that differ from those disclosed herein is described in U.S. Pat. No. 3,364,187. The polymers are converted to the acyl halide derivatives using specific halogenating agents. The patent suggests that the kneading step may be carried out in an extruder, a Banbury mixer, a roll mill or any other apparatus that yields the described kneading action.

A British Patent, 1,257,016, discloses a process for treating polymers with halogenating agents such as N-bromosuccinimide under mechanical shear and at high temperature (120°-180° C.) for the purpose of producing unsaturation. The patent mentions that halogenation may possibly occur in an intermediate step followed by dehydrohalogenation, but production and isolation of a useful halogenated product is not an objective, nor is it achieved. The reference also discloses the use of scavenging amounts of a metal oxide or carbonate such as magnesium oxide, zinc oxide or calcium carbonate in addition to the halogenating agent and alpha-olefin polymer. The patent discloses, as an alternate method, the preblending of the halogenating agent with a solution of the polymer followed by solvent removal. It is stated that very little, if any, reaction occurs during such an operation. The reference does not disclose that scavenging agent can be used to produce halogenated polymers nor that the absence of such scavengers can affect the configuration of the halogenated polymer.

An extensive disclosure of polymer modifications conducted in an extruder can be found in U.S. Pat. No. 3,862,265. This patent is directed to modification of polyolefins using heat, shear and controlled pressure to induce degradation in the polyolefin and to combine the polyolefin with a free-radical initiator and/or one or more monomers. The broad disclosure is of value for its teachings directed to the modification of polyolefins with various monomers especially to form novel grafted polymers.

U.S. Pat. No. 3,510,416 (Vaccari et al) teaches an improved method of halogenating PVC particles by using gaseous chlorine in combination with a swelling agent (chlorination carrier). Following reaction, the PVC particles are transferred to another piece of equipment (a dryer) in which the chlorination carrier is stripped and gaseous by-products are separated. This reference discloses a process based on particle fluidization which relies on diffusion to accomplish drying; in addition, such a process requires separate pieces of equipment and relatively long times for drying.

A recent U.S. Pat. No. 4,384,072, and pending applications U.S. Ser. No. 481,366 (filed Apr. 1, 1983) and Ser. No. 481,320 (filed Apr. 1, 1983) disclose methods for halogenating neat polymers, i.e., not requiring the use of solution techniques. These disclosures are incorporated herein by reference for the benefit of their teachings and their relevance to this process generally, but they do not disclose the advance herein.

In 1979 Van Tongerloo et al disclosed a brominated butyl rubber which was low in conjugated diene content (if any) and in which the halogen was incorporated as primary allylic halogen as well as secondary and tertiary allylic halogen. (Van Tongerloo, A. and Vukov, R., *Proceedings, International Rubber Conference*, Milan, Italy, 1979, p. 70 ff). The reference states that the polymer was produced by a proprietary method and discloses only that rearrangement to the more stable primary configuration can be accomplished in brominated butyl rubber "under a variety of conditions—for example, in the presence of acid, free radicals, bases or heat."

Stabilized halogenated butyl rubber described in U.S. Pat. No. 4,130,519 discloses stabilizing agents which are added to the halogenated rubber following halogenation, i.e., in order to protect the rubber during further processing or during storage.

Some polymers, e.g., butyl rubber, are particularly sensitive when exposed to shear and elevated temperatures in the presence of a halogenating agent. The halogenation reaction of butyl rubber in solution is described in "Encyclopedia of Chemical Technology", Kirk-Othmer, Third Edition (1979), Volume 8 at page 476 ff. It is noted that the halogenation reaction carried beyond one halogen atom per olefin unit is complicated by chain fragmentation. Indeed, such fragmentation or degradation is a persistent problem when halogenation of butyl rubber is attempted; that problem is aggravated under conditions of heat and shear. A method of preparing halogenated butyl rubber in solution is described in U.S. Pat. No. 3,099,644 which is incorporated herein by reference.

SUMMARY OF THE INVENTION

In accordance with the present invention, an improved process has been discovered for the halogenation of polymers, the process comprising adding an effective amount of an acid scavenger to said polymer wherein said scavenger is present during halogenation. In preferred alternative embodiments, the scavenger is added to bulk polymer prior to halogenation in an extruder or the scavenger is added to a solution of the polymer as it is being fed to a halogenation contactor. The products of this process are useful for a wide range of applications including tires, innertubes, mechanical goods, hoses, and electrical products. Halogenated products containing reactive halogen, e.g., halogenated butyl rubber, are capable of being vulcanized with sulfur-free cure systems, for example, zinc oxide in combination with stearic acid; this halogenated rubber can also be vulcanized by standard sulfur and sulfur-donor-containing cure systems.

DESCRIPTION OF THE PREFERRED EMBODIMENTS

Polymers useful in the practice of this invention can be categorized in various ways and include:

(a) olefin polymers, such as the various forms of polyethylene, ethylene-propylene co-polymers, other ethylene copolymers with comonomers such as 1-butene, isobutylene, vinyl acetate, maleic anhydride, ethyl acrylate, methyl acrylate; generally alpha-olefin and cyclic olefin homopolymers and copolymers;

(b) polymers from dienes, such as styrene-butadiene rubber, polychloroprene (Neoprene), butyl, polybutadiene, polyisoprene, butadieneacrylonitrile (Nitrile), ethylene-propylenediene;

(c) vinyl and vinylidene polymers, such as polyvinyl chloride and its family of copolymers, polyvinyl esters such as polyvinyl acetate, acrylic polymers such as polymethylmethacrylate, polystyrene and its family of copolymers such as butadiene-styrene, styrene-acrylonitrile, styrene-isoprene, acrylonitrile-butadienestyrene;

(d) heterochain thermoplastics, such as polyamides, polyesters, polyethers, polysulfides, polyurethanes, polycarbonates.

Unsaturated polymers useful in the present invention include ethylenically unsaturated elastomers, e.g., the several rubbers of commercial significance, for example, butyl rubber, EPDM rubber, styrene butadiene rubber (SBR), polyisoprene rubber and poly (butadiene-isoprene) copolymer rubbers.

The butyl rubber copolymers useful in the present invention contain a major proportion, preferably at least 70 wt. %, of isoolefins and a minor proportion, preferably not more than about 30 wt. %, of multi-olefins. Copolymers of this general type, especially where the copolymer contains about 85-99.5% (preferably 95-99.5%) of a $C_4$-$C_7$ isoolefin, such as isobutylene, with about 15-0.5% (preferably about 5-0.5 wt. %) of a multi-olefin of about 4-14 carbon atoms, are commonly referred to in patents and literature as "butyl rubber"; see, for example, the textbook "Synthetic Rubber" by G. S. Whitby (1954 edition by John Wiley and Sons, Inc.), pages 608-609, "Encyclopedia of Chemical Technology", Third Edition, Volume 8, (1979), pages 470-484, etc. The expression "butyl rubber" as employed in the specification and claims is intended to include copolymers containing about 80-99% by weight of an isoolefin of about 4-7 carbon atoms and about 20-1% of conjugated multi-olefin of about 4-10 carbon atoms. The preparation of butyl-type rubbers is amply described in the literature. In general, it consists of the reaction product of a $C_4$-$C_7$ isoolefin (preferably isobutylene) with a $C_4$-$C_{10}$ (preferably a $C_4$-$C_6$ conjugated diolefin, such as isoprene, butadiene, dimethyl butadiene, piperylene, etc. The reaction product of isobutylene and isoprene is preferred. The preparation of butyl rubber is described in U.S. Pat. No. 2,356,128 which is incorporated herein by reference.

Conventional high molecular weight butyl rubber generally has a number average molecular weight of about 25,000 to about 500,000, preferably about 80,000 to about 300,000, especially about 100,000 to about 250,000; and a Wijs Iodine No. of about 0.5 to 50, preferably 1 to 20. More recently low molecular weight polymers have also been prepared which have number average molecular weights of from 5,000 to 25,000 and unsaturation expressed as mole %, of 2-10.

The term "EPDM" as used in the specification and claims is used in the sense of its ASTM definition and is intended to mean a terpolymer containing ethylene and propylene in the backbone and diene enchainment with residual unsaturation in the sidechains. Illustrative methods for producing these terpolymers are found in U.S. Pat. No. 3,280,082, British Patent 1,030,989 and French Patent 1,386,600 which are incorporated herein by reference.

The preferred polymers contain about 45 to about 80 wt. % ethylene and about 1 to about 10 wt. % diene monomer. The balance of the polymer is propylene. Preferably, the polymer contains 45 to 70 wt. % ethylene, most preferably 50 to 60 wt. % ethylene, e.g., 56 wt. %, and about 2 to about 9 wt. % diene monomer, more preferably about 2 to about 6 wt. % diene monomer, most preferably 2.6 to 4 wt. % diene monomer. The diene monomer is a non-conjugated diene. Illustrative of these non-conjugated diene monomers which may be used in the terpolymer (EPDM) are hexadiene, dicyclopentadiene, ethylidene norbornene, methylene norbornene, propylidene norbornene and methyltetrahydroindene. A typical EPDM containing ethylidene norbornene as a diene monomer is Vistalon 4608 (Exxon Chemical Company, U.S.A.), a polymer having a Mooney viscosity at 260° F. of about 62, and an ethylene content of about 56 wt. %.

The polyisoprene rubber referred to in this invention may be natural rubber or synthetic polyisoprene prepared by processes well known in the art, and, in general, has a molecular weight of from about 500 to about 500,000, preferably about 1500 to about 200,000.

The polybutadiene and poly(butadiene-isoprene) copolymer rubbers referred to in this invention include the geometric isomers thereof, all of which may be prepared by processes well known in the art. In general, such polymers and copolymers have a molecular weight of from about 500 to about 500,000, preferably from about 1500 to about 200,000. Generally, polybutadiene rubbers have Mooney viscosity values, measured at 212° F., of from about 25 to about 65, preferably from about 35 to about 55, most preferably from about 40 to about 50.

The styrene butadiene rubber referred to in this invention is also known as poly(butadiene-co-styrene), and typically abbreviated SBR, and includes rubbers prepared by the emulsion (hot and cold) and solution processes well known in the art. Bound styrene levels are from about 3 to about 50 wt. %, preferably from about 10 to about 45 wt. %, most preferably from about 12 to about 30 wt. %, for example, 23.5 wt. %. Generally, such polymers have Mooney viscosity values, measured at 212° F., of from about 20 to 130 and above, preferably from about 35 to about 80, most preferably from about 40 to about 70, for Example 52.

The butadiene in such copolymers is present as all three geometric isomers, cis-1,4, trans-1,4 and 1,2 or vinyl and the copolymer can be random, block or graft.

The elastomers or rubbers referred to above and processes for their preparation are generally described in the Kirk-Othmer "Encyclopedia of Chemical Technology", Third Edition, Volume 8, (1979), butyl p. 470 ff, EPDM p. 492 ff, polybutadiene p. 546 ff, polyisoprene p. 582 ff and poly(butadiene-co-styrene) p. 608 ff, incorporated herein by reference.

Some forms of halogenated butyl rubber, prepared in solution according to processes described above, are commercially available, e.g., chlorinated butyl rubber and brominated butyl rubber. One method used to prepare halogenated butyl rubber is that of halogenating butyl rubber in a solution (butyl rubber cement) containing between 1 to 60% by weight of butyl rubber in a substantially inert $C_5$–$C_8$ hydrocarbon solvent such as pentane, hexane, heptane, etc., and contacting this butyl rubber cement with a halogen for a period of up to about 25 minutes. There is then formed the halogenated butyl rubber and a hydrogen halide, the polymer containing up to one or somewhat more halogen atoms per double bond initially present in the polymer. Generally, halogenated butyl rubber comprises a copolymer of 85 to 99.5 wt. % of a $C_4$ to $C_8$ isoolefin, e.g., isobutylene, with 15 to 0.5 wt. % of a $C_4$ to $C_{14}$ multi-olefin, e.g., isoprene, containing at least about 0.5 wt. % combined halogen in its structure. For example, where butyl is halogenated with bromine, the bromine can be present in the brominated butyl in an amount of from about 1.0 to about 3.0 wt. %, preferably from about 1.5 to about 2.5 wt. %. A method of preparing conventionally halogenated butyl rubber is described in U.S. Pat. No. 3,099,644, which is incorporated herein by reference.

The preparation, in solution, of halogenated butyl rubber containing both bromine and chlorine, i.e., bromochlorinated butyl rubber, is described in U.S. Pat. No. 4,254,240, incorporated herein by reference. The potential for molecular weight breakdown of the butyl rubber, noted earlier, is present even where bromine chloride is used as the halogenating agent, as disclosed in this reference (column 4, lines 24–32).

The invention disclosed herein is also particularly useful for the halogenation of saturated polymers. Such polymers include rubbers such as ethylene-propylene copolymers (EPM), generally known in the art and similar in their preparation and composition to EPDM terpolymers with the exception of the presence of residual unsaturation; also included is polyisobutylene rubber, produced commercially in grades varying as to molecular weight.

Other saturated polymers useful in the practice of the instant invention include olefin polymers such as high and low density polyethylene (HDPE and LDPE) and linear low density polyethylene (LLDPE), copolymers of ethylene such as ethylene-vinyl acetate, and polyvinyl and vinyl polymers, for example, polyvinyl chloride.

HDPE has a density of about 0.941 to about 0.965 g/cc. High density polyethylene is an established product of commerce and its manufacture and general properties are well known in the art. Typically, HDPE has a relatively broad molecular weight distribution, characterized by the ratio of weight average to number average molecular weight, of from about 20 to about 40. LDPE is, similarly, an item of commerce, and typically includes products with densities in the range of about 0.910 to about 0.925 g/cc. Medium density polyethylene should not be excluded as a useful polymer, e.g., about 0.925 to about 0.940 g/cc.

Linear low density polyethylene (LLDPE) is a relatively new class of low density polyethylene characterized by little, if any, long chain branching, in contrast to conventional low density polyethylene. The processes for producing LLDPE are well known in the art and commercial grades of this polyolefin plastic are available. Generally, it is produced in gas-phase fluidized bed reactors or liquid-phase solution process reactors; the former process can be carried out at pressures of about 100 to 300 psi and temperatures as low as 100° C. Polymers can be made in the gas phase with melt indices and densities over the full commercial range and with molecular weight distributions from very narrow to very broad.

Polyethylene copolymers include copolymers of ethylene and alpha-olefins having 3 to 16 carbon atoms, for example, propylene, 1-butene, etc. Also included are copolymers of ethylene with an unsaturated ester of a lower carboxylic acid. In particular, copolymers of ethylene with vinyl acetate or alkyl acrylates, for example, methyl acrylate and ethyl acrylate, are employed. For the purposes of this invention, polyethylene copolymers are also considered to include blends of polyethylene and polyethylene copolymers. Many such ethylene copolymers are available as items of commerce and their composition and methods for producing them are well known in the art.

Polyvinyl chloride (PVC) is the most commercially significant member of the polyvinyl and vinyl copolymer family which comprises various polymers based on the vinyl radical or vinylidene radical. Vinyl chloride has been copolymerized with materials such as vinyl acetate, acrylic esters and vinylidene chloride. More recently other polymers have been grafted to polyvinyl chloride including ethylene vinyl acetate and EPDM. PVC is manufactured commercially using various well known polymerization processes: suspension, mass, emulsion/dispersion and solution; the first is the dominant method. The product is available in several forms including particles, fine powders and latexes.

In the halogenation of the polymers suitable for use in this invention, hydrogen halide is often formed as a by-product. It is the objective of this invention to remove the hydrogen halide by reaction with an effective amount of an acid scavenger. Such removal precludes the acid from being available to participate in further addition and/or rearrangement and/or degradation reactions. In addition, the acid will not be available to cause corrosion problems, particularly if an aqueous stream is present.

Several types of scavengers are useful in this process. Generally suitable is any scavenger that is capable of reacting with the hydrogen halide, but does not interfere with the subsequent utility of the polymer, or can be removed from the polymer prior to its eventual end use. Useful scavenging agents include alkali metal or alkaline earth metal carboxylates, epoxides, metal oxides, metal hydroxides inorganic salts of strong bases and weak acids and mixtures thereof.

The metal portion of the metal carboxylate can be an alkali or alkaline earth metal. Thus, particularly suitable carboxylates are those of sodium, magnesium, and calcium. The carboxylic acid from which the carboxylate is derived can be mono- or poly-carboxylic. Thus, suitable mono-carboxylic acids are the $C_4$ to $C_{20}$ mono-carboxylic acids such as caproic, caprylic, pelargonic, myristic, palmitic, oleic, stearic and 2-ethyl hexanoic acids. Also suitable is naphthenic acid. The preferred metal carboxylate is calcium stearate.

Suitable epoxides are the products formed by epoxidizing esters and glycerides of unsaturated fatty acids of about $C_8$ to $C_{24}$, such esters as soybean oil, castor oil, linseed oil, safflower oil, etc. The preferred specific polyethers of this class include epoxidized soybean oil and epoxidized linseed oil (sold under the trademarks Drapex 6.8 and Drapex 10.4, respectively). Other suitable epoxides are monomeric low molecular weight, e.g., $C_2$–$C_7$, monofunctional epoxides, such as ethylene epoxide, propylene epoxide, butylene epoxide, etc.; preferred are ethylene, propylene and butylene epoxide. Also suitable are aryl substituted alkyl epoxide, for example 1,2-epoxyethylbenzene, i.e, styrene epoxide.

The metal oxides or hydroxides suitable for use in this invention include those wherein the metal is selected from Group IIA of the Periodic Table. Particularly suitable are $Ca(OH)_2$, CaO, $Mg(OH)_2$ and MgO.

Suitable examples of inorganic salts of strong bases and weak acids include bicarbonates of sodium, potassium and calcium.

The acid scavenger should be present in an amount which is effective to react with the hydrogen halide by-product formed during halogenation, taking into consideration reaction kinetics, e.g., temperature in the region in which the scavenger must react, the time available for the reaction compared to the potential for the acid halide to cause an undesirable side reaction (e.g. addition or degradation or isomerization), the use of additional means to remove hydrogen halide from the process (e.g., gas scrubbing, particularly in a process for halogenation of neat polymer), etc. Some limited experimentation, well within the skill of those in the art, will readily determine the effective amount of scavenger to be used in the particular circumstances at hand. As a general guide it will be recognized that in the absence of other means of removing hydrogen halide (e.g., gas scrubbing), one equivalent of scavenger is required at equilibrium per equivalent of hydrogen halide generated, but that as a practical matter up to about two to three times the theoretical amount can be used effectively. Where supplementary means are provided for hydrogen halide removal or where the effect of the hydrogen halide on the polymer is not particularly negative, as little as one-half or one-quarter the theoretical amount can be used effectively.

As noted above, certain polymers are particularly sensitive to the presence of hydrogen halide, and polymer changes can be accelerated at elevated temperatures. For example, although bromination of butyl rubber at moderate temperature (e.g. 25° C.) can result in a brominated polymer with a high proportion of secondary allylic bromine, and minor amounts of tertiary, isomerization to a primary allylic structure increases at elevated temperatures; isomerization at elevated temperature is also increased in an acidic environment. Use of an acid scavenger reduces such isomerization, as where the polymer is present during the halogenation process at a temperature of from about 50°–190° C., particularly 60°–175° C., more particularly 65°–140° C., most particularly 70°–125° C., for example at 75°–115° C.

In one preferred embodiment the polymer and halogenating agent are contacted, or reacted, in a nonsolution, continuous flow device; a neat or bulk process. Suitable devices include kneaders, extruders (employing single or multiple screws, e.g., twin screws, continuous mixers and a recently disclosed blending/extrusion device referred to as a cavity transfer mixer (see, e.g., European Rubber Journal, July-August, 1982, pages 29–32 and G. M. Gale, U.K. Patent Application 8030586, 1980). Although such polymers can attain very high viscosities, even at relatively high temperatures, such devices are capable of subjecting polymers to deformation.

The continuous flow device should be capable of initially forming the polymer feed into a cohesive mass and then deforming the polymer, disrupting the polymer surface, thereby exposing fresh, i.e., unreacted, polymer to the halogenating agent. The exposure of new surface does not necessarily require the use of high speeds where, e.g., an extruder is used. However, surface disrupting means are preferably employed (as will be described in detail below), for example, pins, reverse flow sections, a "Maillefer" screw design, the cavities of a cavity transfer mixer, multiple flight screw section, interrupted flight sections, e.g., slotted flights, and combinations thereof. A process for the neat halogenation (non-solution) of polymers is described in detail in U.S. patent applications, Ser. Nos. 481,320 and 481,366 incorporated herein by reference. When carrying out the present invention in such processes, the acid scavenger can be added to the polymer feed. This can be achieved, e.g., by preblending the scavenger with polymer or by feeding the scavenger with the polymer as the polymer is fed to the halogenating device. In both cases, the amount of scavenger is controlled so as to achieve the desired effect of reacting with by-product hydrogen halide; excessive amounts are not beneficial as they add to the cost of the process and can be residual additives in the polymer. If the scavenger is intended to serve an additional purpose in the finished polymer, e.g., further stabilization against dehydrohalogenation or heat, the amount used can be adjusted for that purpose.

In another preferred embodiment halogenation is conducted in a solution process, i.e., a solution of the polymer in a suitable, non-reactive solvent (a "cement") is halogenated. Such a process is well known in the art and has been referred to previously. In such a process, the acid scavenger can be added to the cement prior to contact with the halogenating agent. Alternatively, the scavenger can be added to the reactor to which the halogenating agent is being added. In order to improve the efficiency of the scavenger suitable means should be provided for thorough mixing or dispersion of the scavenger in the reaction medium.

As described in the cited references incorporated herein, the halogenating agent can be gaseous, liquid or solid and may be further diluted with a suitable inert fluid, e.g., organic or inorganic liquids as well as gases such as inert gases, $CO_2$ and air. Suitable halogenating agents include chlorine, bromine, sulfuryl halide, etc. Gaseous chlorine and bromine are preferred, particularly when mixed with nitrogen.

Following reaction in either a neat or solution process, the process features normally employed can be utilized, e.g., neutralization to insure that unwanted by-products and unreacted halogenating agent are reduced or eliminated, stabilizer addition, solvent removal where warranted, drying where required, etc.

The halogenated polymers of this invention can be processed in standard equipment used for each such polymer, such as internal mixers, mills, extruders, calenders, etc. Said polymers are amenable to conventional compounding practice and various fillers and extenders can be incorporated, e.g., various carbon blacks, clays, silicas, carbonates, oils, resins, waxes, etc.

As described previously, various halogenated polymers are produced by the process of this invention. Halogenated butyl rubber of this invention (e.g., chlorinated and/or brominated) may be cured or vulcanized by any of the prior art methods suitable for such halogenated rubbers, e.g., using sulfur, sulfur-containing curing agents (such as sulfenamide derivatives, benzothiazyl disulfide, tetramethylthiouram disulfide, alkyl phenol disulfide, etc.), zinc oxide alone or with various promoters, and mixtures thereof. Curing is usually accomplished at a temperature of from about 140° C. to about 250° C., preferably 150° C., to about 200° C., and usually takes from 1 to 150 minutes. Such rubber is useful in tires, e.g., innerliners and sidewalls; in innertubes; hoses; mechanical goods; sheeting; electrical insulation; plastic blends, etc.

This invention will be further understood by reference to the following examples which describe equipment demonstrating the principles of this invention.

EXAMPLE 1

This invention is particularly useful in the bromination of butyl rubber. In the bromination of butyl rubber, isoprene residues in the rubber (I) react with bromine to yield substited structure II and by-product hydrogen bromide:

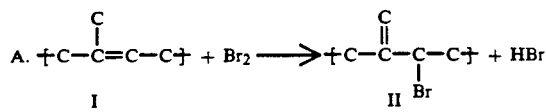

Further reaction of structure II results in structure III via rearrangement, conjugated diene structure IV via elimination and conjugated diene structure V via elimination and rearrangement:

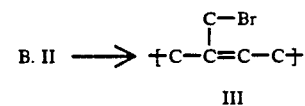

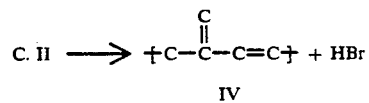

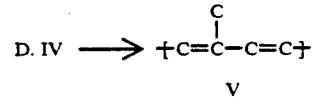

In commercial brominated butyl rubber made in solution, the reacted isoprene residues are primarily structure II, with minor proportions of structures III and V. It is also observed that some molecular weight degradation occurs during halogenation as measured by Mooney viscosity of the halogenated elastomer compared to the starting rubber, for example a decrease of about 5–10 points in a test conducted at 125° C. (one minute preheat, eight minute test).

In a bulk or neat halogenation process the brominated product has been found to contain a different distribution of structures and somewhat greater molecular weight loss. This is summarized in the following table.

TABLE I

| Typical Bromobutyl Comparison Prior to This Invention | | | |
|---|---|---|---|
| Halogenation | Proportion of Reacted I | | | Mooney Loss (1' + 8') |
| Method | II | III | V | 125° C., Points |
| Solution | 70–90 | 5–20 | 3–10 | 5–10 |
| Bulk/neat | 10–50 | 40–70 | 15–30 | 13–20 |

In the following experiments, the acid scavengers shown were first dispersed in the butyl rubber to be halogenated by mixing the scavenger and butyl in a Banbury mixer for about 2 minutes. The rubber was then halogenated in the bulk phase using an extrusion device as described in U.S. Pat. Application Ser. No. 481,320, using a partially filled reaction zone, a mixture of bromine and nitrogen as the halogenating agent and nitrogen purging following reaction. The amount of scavenger shown is weight percent based on the polymer and the distribution of structures was determined using nuclear magnetic resonance spectroscopy (NMR).

TABLE II
Effect of Acid Scavengers on Bulk Bromination of Butyl

| Scavenger | Run | Proportion of Reacted I | | | Mooney Loss, (1'+ 8') 125° C., Points |
|---|---|---|---|---|---|
| | | II | III | V | |
| None | A | 10 | 62 | 28 | 13 |
| | B | 43 | 43 | 15 | 19 |
| | C | 37 | 41 | 22 | 13 |
| 1% CaSt₂* | D | 50 | 42 | 8 | 15 |
| 0.1% MgO | E | 50 | 32 | 18 | 8 |
| 0.3% ESBO* | E | 68 | 17 | 15 | 5 |

*CaSt₂ = calcium stearate
ESBO = Epoxidized soybean oil

The acid scavengers had a significant effect on the structure of the rubber produced as well as generally resulting in less molecular weight loss.

As discussed previously, the acid scavengers can be effectively used in combination; Table III shows the results of several combinations.

TABLE III
Scavenger Combinations in Bulk Bromination of Butyl

| Scavenger | Run | Proportion of Reacted I | | | Mooney Loss, (1'+ 8') 125° C., Points |
|---|---|---|---|---|---|
| | | II | III | V | |
| None | A | 10 | 62 | 28 | 13 |
| | B | 43 | 43 | 15 | 19 |
| | C | 37 | 41 | 22 | 13 |
| 0.1% CaSt₂ 0.1% ESBO | B | 55 | 33 | 12 | — |
| 1% CaSt₂ 1% ESBO | D | 78 | 17 | 6 | — |
| 0.3% ESBO 0.1% MgO | F, G | 80 | 10 | 10 | 6 |
| 0.4% ESBO 0.08% MgO | H | 78 | 16 | 5 | 8 |

Extruder conditions were as follows;

| Run | Reactor Length, in. | Stripper Length, in. | Stripper Injection, in. | Stabilizer Injection, in. |
|---|---|---|---|---|
| A | 55 | 19 | 3 | — |
| B | 55 | 19 | 9 | 9 |
| C-H | 49 | 25 | 9 | 15 |

In all runs bromine/nitrogen injection was 5 in. from the start of the reaction zone and the reaction zone screw configuration consisted of alternating forward triple slotted flights and forward single and double flights. Stripping was accomplished with 0.5–4 kg/hr. nitrogen; injection point is measured from the extruder exit. Stabilizer consisted of calcium stearate and expoxidized soybean oil; point of injection measured from extruder exit. Additional conditions were as follows:

| Run | Rubber Feed kg/hr | Bromine Feed kg/hr | N2/Br2 | RPM | Reactor Pressure Bar (absol.) | Reaction Zone Rubber Temp., °C. |
|---|---|---|---|---|---|---|
| A | 35 | 2.4 | 3 | 95 | 4–5 | 90 |
| B | 32 | 2 | 3–4 | 88 | 4.25 | 90 |
| C | 38 | 2.4 | 4 | 114 | 6 | 110 |
| D | 36 | 2.4 | 4–6 | 90 | 7.5 | 105 |
| E | 35 | 2 | 4.5–5 | 90 | 7–8 | 95 |
| F | 38 | 1.8 | 6–8 | 92 | 7.2 | 90 |
| G | 36 | 2.7 | 4–5 | 92 | 7–8 | 95 |
| H | 36 | 2.5 | 3–5 | 90 | 4–5 | 95 |

EXAMPLE 2

Solution bromination was conducted using butyl rubber with a commercial grade designation of 268 (Exxon Chemical Co.); Mooney viscosity of the rubber was 58 (125° C.) and unsaturation was 1.65 mole %. Halogenation was conducted in a 500 ml., 4 neck round bottom flask which was blackened to exclude light. The rubber was dissolved in U.V. grade hexane to prepare a 20 wt. % cement. The flask was fitted with a wet ice condenser, stirrer, sampling tube and nitrogen bubbler and immersed in a temperature controlled bath.

(A) Control run

Bath temperature 55° C., no acid scavenger, 250 g butyl (grade 278) in hexane, 2.453 g bromine in 5 g. hexane added for bromination. The polymer obtained after 245 sec. of reaction had the following features:

| | |
|---|---|
| Bromine, wt. % | 2.1 |
| Molecular Weight, vis. avg. | 380,000 |
| Type II Br, mole % | 28 |
| Type III Br, mole % | 59 |

(B) Acid scavenged run

Bath temperature 55° C., acid scavenger – epoxidized linseed oil, 10.4 wt. % epoxy oxygen (commercial designation Drapex 10.4), 271 g butyl in hexane, 7.3 g scavenger added to cement and stirred at 800 rpm for 20 min., 2.76 g bromine in 20 g hexane added. Samples removed at 160, 404 and 710 seconds neutralized with 15 ml. 0.5% NaOH and 10 ml hexane. Results:

| Time | Bromine, wt. % | Molecular Weight |
|---|---|---|
| 160 | 2.22 | 426,000 |
| 404 | 2.69 | 419,000 |
| 710 | 2.48 | 413,000 |

Each of the samples had only trace amounts of Type III structure; 100% Type II.

These results demonstrate the effectiveness of acid scavenging.

What we claim is:

1. A continuous process for halogenating butyl rubber polymer comprising adding an effective amount of an acid scavenger to said polymer wherein said scavenger is present during halogenation thereby reducing hydrogen halide addition and/or rearrangement reactions, where said reduction may be confirmed by a higher level of structure Type II,

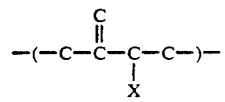

wherein X is bromine or chlorine, over that produced without the presence of said scavenger, and/or a reduction in degradation reactions, which may be confirmed by lower molecular weight loss than is produced without the presence of said scavenger, said halogenation being chlorination or bromination, wherein said scavenger is selected from the group consisting of alkali metal or alkaline earth metal carboxylates, epoxides, metal oxides or hydroxides, inorganic salts of strong bases and weak acids and mixtures thereof, wherein said epoxide is selected from the group consisting of epoxidized esters and glycerides of unsaturated fatty acids of about $C_8$ to $C_{24}$.

2. The process of claim 1 wherein said halogenation is conducted in solution.

3. The process of claim 1 wherein said halogenation is neat.

4. The process of claim 1 wherein said scavenger is added to said polymer prior to contacting with said halogenating agent.

5. The process of claim 1 wherein said scavenger is added during halogenation of said polymer.

6. The process of claim 1 wherein said carboxylate is a $C_4$ to $C_{20}$ mono-carboxylate.

7. The process of claim 6 wherein said carboxylate is selected from the group consisting of sodium, magnesium and calcium carboxylate.

8. The process of claim 7 wherein said carboxylate is calcium stearate.

9. The process of claim 1 wherein said epoxide is epoxidized soybean oil or epoxidized linseed oil.

10. The process of claim 1 wherein said metal oxide or hydroxide is selected from the metals of Group IIA of the Periodic Table.

11. The process of claim 10 wherein said metal oxide or hydroxide is selected from the group consisting of $Ca(OH)_2$, CaO, $Mg(OH)_2$ and MgO.

12. The process of claim 1 wherein said scavenger is a mixture of an epoxide and a metal oxide.

13. The process of claim 12 wherein said epoxide is epoxidized soybean oil and said metal oxide is magnesium oxide.

14. The process of claim 1 wherein said epoxide is epoxidized soybean oil and said metal carboxylate is calcium stearate.

15. The process of claim 1 wherein said acid scavenger is present in an amount of up to about three times the equivalent of said scavenger per equivalent of hydrogen halide by-product.

16. The process of claim 1 wherein said halogenation is conducted at a temperature of from about 50°–130° C.

17. The process of claim 1 wherein said inorganic salt is selected from the group consisting of bicarbonates of sodium, potassium and calcium.

18. The process of claim 1 wherein said process is less likely to produce acidic corrosion.

* * * * *